United States Patent [19]

Nakamura

[11] Patent Number: 5,232,108
[45] Date of Patent: Aug. 3, 1993

[54] PREFORM HAVING INNER PARTITION WALL AND PROCESS OF MAKING PLASTIC VESSEL HAVING INNER PARTITION WALL

[75] Inventor: Yoshinori Nakamura, Ueda, Japan

[73] Assignee: Nissei Asb Machine Co., Ltd., Komor, Japan

[21] Appl. No.: 930,603

[22] PCT Filed: Feb. 10, 1992

[86] PCT No.: PCT/JP92/00129
§ 371 Date: Oct. 5, 1992
§ 102(e) Date: Oct. 5, 1992

[87] PCT Pub. No.: WO92/13702
PCT Pub. Date: Aug. 20, 1992

[30] Foreign Application Priority Data

Feb. 9, 1991 [JP] Japan ............................ 3-39194

[51] Int. Cl.$^5$ ............................................ B65D 1/04
[52] U.S. Cl. ................................... 215/6; 215/10; 264/540
[58] Field of Search .................. 215/6, 10; 264/523, 264/531, 540, 525

[56] References Cited

U.S. PATENT DOCUMENTS 3,144,152  5/1964  Kopp ..................................... 215/6
3,696,919 10/1972  Miles ..................................... 215/6
4,121,976 10/1978  Gleeson ............................... 215/1 C
4,279,349  7/1981  Aignon ................................. 215/1 C
5,160,059 11/1992  Colleite et al. ..................... 215/1 C

FOREIGN PATENT DOCUMENTS 3-236932 10/1991 Japan .

Primary Examiner—Joseph Man-Fu Moy
Attorney, Agent, or Firm—James A. Oliff

[57] ABSTRACT

A preform (70) has an open top portion (72), a cylindrical barrel portion (74) and a bottom portion (76) formed to close the barrel portion (74) at the end opposite to the open top portion (72). The preform (70) also has an internal partition wall (78) formed to extend across the interior of the barrel portion and from the bottom portion (76). In the transverse direction relative to the longitudinal center axis of the preform (70), the internal partition wall (78) has the maximum wall thickness (a2) at the connection (84) between the inner wall of the barrel portion (74) and the internal partition wall (78), the maximum wall thickness of the internal partition wall being gradually reduced toward the longitudinal center axis of the preform with the minimum wall thickness (a1) at a position (82) near the longitudinal center axis of the preform.

14 Claims, 13 Drawing Sheets

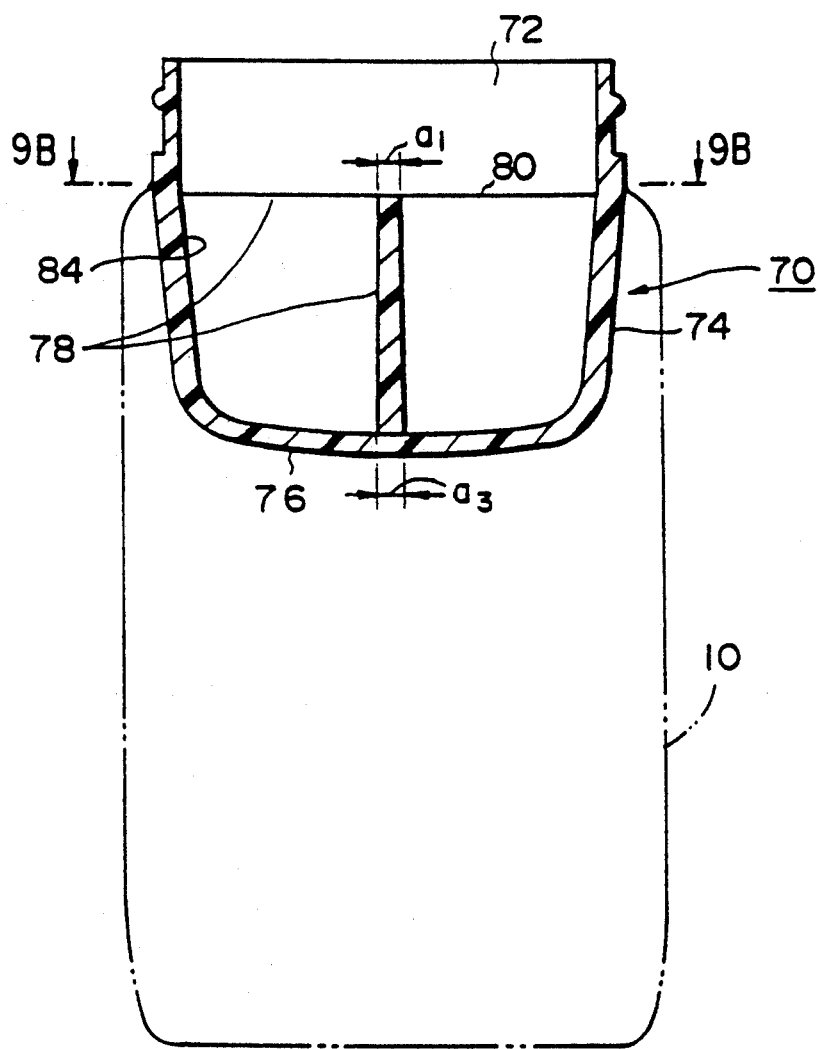
FIG. 9A
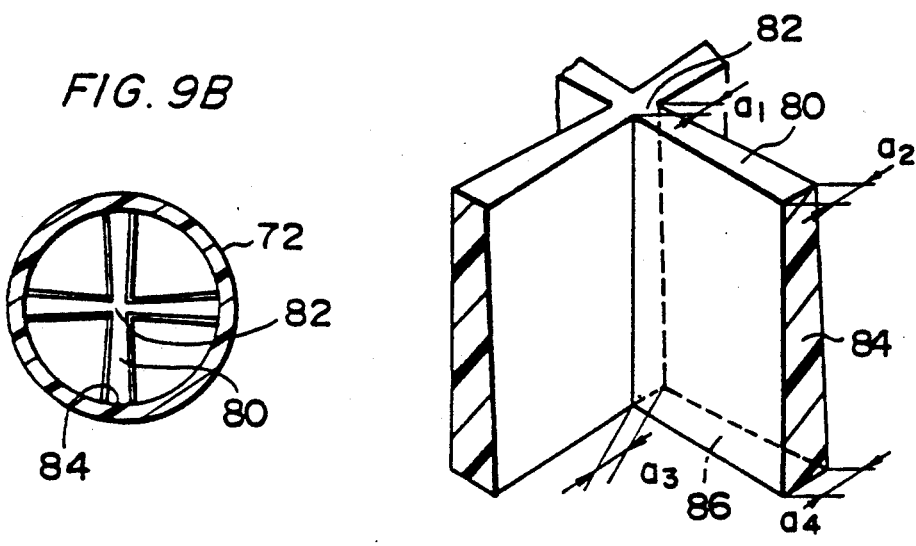
FIG. 9B
FIG. 9C

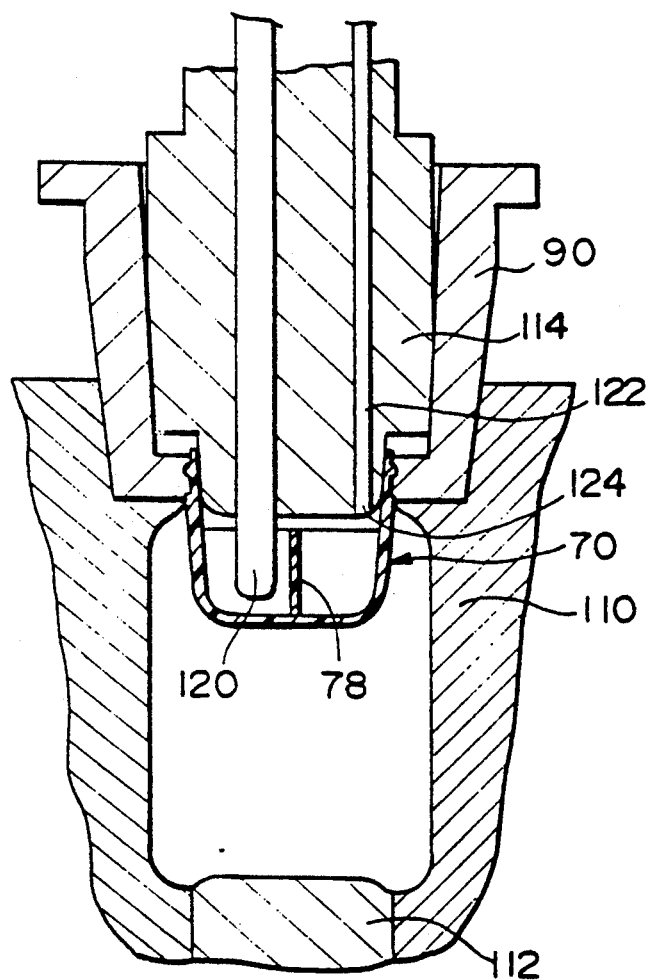
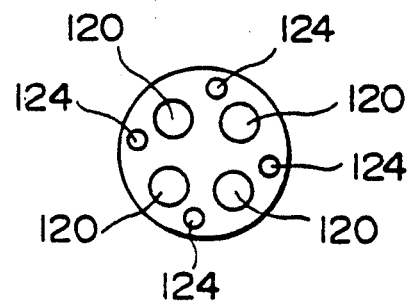
FIG. 12

PREFORM HAVING INNER PARTITION WALL AND PROCESS OF MAKING PLASTIC VESSEL HAVING INNER PARTITION WALL

BACKGROUND OF THE INVENTION

1. Technical Field

The present invention relates to a preform usable in molding a plastic vessel having an internal partition wall which is capable of resisting an internal pressure from a filled matter, and a process of making such a plastic vessel.

2. Background Techniques

When a preform is biaxially oriented, it is known in the art to provide a plastic vessel which has an open top portion as part of the preform, a cylindrical barrel portion formed below the top portion and having an internal diameter larger than that of the top portion, a shoulder portion connecting between the top and barrel portions, and a bottom portion formed to close the barrel portion at the end remote from the top portion. Many plastic vessels molded by the prior art generally have increased degrees of stretching in longitudinal and transverse axes and circular cross-sections in their barrel portions. In such plastic vessels, the internal stress from the internal pressure can be uniformly dispersed through the barrel portion in its circumferential direction since the barrel portion is of circular cross-section. Further, any distortion of the barrel portion due to the internal pressure from such as carbon dioxide gas can be fully prevented by the mechanical strength of the barrel portion which has been increased by crystallization from the biaxial orientation.

In case when a plastic vessel has its barrel portion of triangular or square cross-section or of oval cross-section, however, the internal pressure will concentrate on only a part of the side barrel wall, resulting in distortion of the side barrel wall which is weaker in mechanical strength.

In a further case of so-called wide-mouthed type plastic vessels in which the difference of internal diameter between the top and barrel portions in a plastic vessel is relatively small, such plastic vessels are inferior in mechanical strength even if they are biaxially oriented for crystallization, because the ratio of transverse stretch is small. Even if a widemouthed type plastic vessel is of circular cross-section, it is probably impossible to prevent certainly the distortion in the barrel portion of such a plastic vessel due to the internal pressure from the contents therein.

A proposal for increasing a wide-mouthed type plastic vessel in its mechanical strength is made in WO90/05674 which discloses a bottle comprising an internal spider which extends across the interior of the bottle and is biaxially oriented with the side wall of the bottle.

In the biaxial-stretch blow molding process for such a bottle, the smoothness of its biaxially stretching operation for a preform is obstructed by the presence of the internal spider, unlike the prior art biaxial orientation for cylindrical preforms. Since the internal spider is connected at one end to the inner side wall of the preform, that portion of inner side wall which is connected to the internal spider substantially resists the biaxial stretching step. It has been found that when the preform has been molded into a bottle, the outer side wall of the bottle tends to have a recess formed therein at that portion of the bottle which is connected to the internal spider. Such a recess will very damage the external appearance of the produced bottle.

In course of the inventors' study, it has been found that it is very difficult to form such an internal spider into a substantially uniform wall thickness when a bottle is molded. Unlike the conventional process for biaxially stretching only the side wall of the preform, the portions of the spider extending in various directions resist to each other on stretching such that the preform will be prevented from being stretched into a uniform wall thickness. In addition, it has been found that when the preform is stretched by a stretching rod along the longitudinal axis and by a blown air in the transverse direction within each of the partitions divided by the internal spider, the internal spider will be bias stretched in a particular orientation.

It was thus difficult that an actually usable bottle having its internal spider could be molded without various improvements.

It is therefore an object of the present invention to provide a preform which is optimum in molding a plastic vessel having an internal partition wall.

Another object of the present invention is to provide a process of molding a plastic vessel having an internal partition wall without damage to the external appearance thereof.

DISCLOSURE OF THE INVENTION

To this end, the present invention provides a preform to be biaxially stretched and blow molded into a plastic vessel, said preform comprising an open top portion, a cylindrical barrel portion, a bottom portion formed to close the barrel portion at the end opposite to the open top and an internal partition wall formed within said barrel portion to extend from one side to the other side of the inner wall and to extend longitudinally from the bottom portion, said preform being characterized by that said internal partition wall has a thickness profile in the transverse direction relative to the longitudinal axis of the preform in which the wall thickness is maximum at the connection between the internal partition wall and the inner wall of the barrel portion, the wall thickness of the internal partition wall is gradually reduced toward the longitudinal center axis of the preform.

The portion of the internal partition wall having the increased wall thickness adjacent to the inner wall of the barrel portion can be more easily stretched since it has an increased thermal capacity. Thus, the internal partition wall can be fully stretched following the biaxially stretching of the barrel portion at the increased wall thickness of the internal partition wall. The central portion of the internal partition wall is subjected to a relatively weak stretching force and inherently less stretched. Therefore, if the wall thickness of the internal partition wall is set to be relatively thin at and near the central portion thereof and also to be gradually increased toward the outer portion of the internal partition wall having the maximum wall thickness, the internal partition wall can be smoothly stretched in the transverse direction to have a substantially uniform wall thickness after stretched. The wall thickness of the internal partition wall at and near the central portion thereof may be substantially uniform through an extent in the transverse direction.

It is preferred that the internal partition wall also has a thickness profile in the longitudinal direction of the preform, in which the wall thickness is maximum at the connection between the internal partition wall and the bottom portion, the wall thickness of the internal partition wall is gradually reduced toward the top of the internal partition wall. This is advantageous in that the step of regulating the temperature of the preform do not necessarily require a complicated distribution of temperature in the direction of the longitudinal axis. It may be secured that the internal partition wall of the preform is stretched into a uniform wall thickness even along the longitudinal axis.

In order to prevent any distortion due to the internal pressure, the top end of the internal partition wall may be formed short of the open top portion of the preform within the barrel portion. It is preferred that the top end portion of the internal partition wall near the longitudinal center axis of the preform is lower than the top end portion of the internal partition wall near the connection between the internal partition wall and the inner barrel wall. This is because such an arrangement can facilitate the stretching near the center of the internal partition wall.

The internal partition wall may be extended to the open top portion of the preform and preferably to the top edge thereof. In such a case, that portion of the internal partition wall located within the top portion must have a wall thickness smaller than the minimum wall thickness of the internal partition wall within the barrel portion of the preform. Thus, the portion of the internal partition wall located within the top portion is not easily stretched so that the sealing configuration to the top edge can be retained even after the preform has been blow molded into a desired vessel. If a cap is mounted on such a vessel, the inner bottom face of the cap co-operates with the internal partition wall to provide a plurality of separately divided partitions.

The present invention also provides a process of biaxialstretch blow molding a plastic vessel, said process being characterized by the steps of injection molding a preform having an open top portion, a cylindrical barrel portion having a closed bottom, and an internal partition wall formed to extend from one side of the inner wall of the barrel portion to the other side of the same and to extend longitudinally from the inner face of the closed bottom, stretchedly driving said bottom portion along the longitudinal axis of said preform by the use of a plurality of stretching rods each arranged for the respective one of partitions divided by the internal partition wall of said preform while at the same time stretching said preform in the transverse direction by introducing a pressurized air into the respective divided partitions, the inner end of each of said stretching rods including a tip member arranged therein at a position offset toward the longitudinal center axis of said preform than the center of the corresponding partition, whereby said internal partition wall can be guided by said tip members when said preform is being stretched along the longitudinal axis thereof.

In accordance with the present invention, the stretching is carried out by the stretching rod and blown air in each of the partitions of the preform which are separately divided by the internal partition wall. If a stretching rod is positioned substantially at the center of each of the partitions, a deviation out of the longitudinal center axis tends to be created near the longitudinal center axis which is the central junction in the internal partition wall, due to a slight deviation for the rod's position, a difference between the internal pressures of the respective partitions, a temperature dispersion and so on. In order to overcome such a problem, each of the tip members is positioned within the respective one of the separately divided partitions at a position offset toward the longitudinal center axis of the preform. Thus, the internal partition wall can be stretched directly along the longitudinal axis of the preform.

BRIEF DESCRIPTION OF THE DRAWINGS

FIG. 9A is a schematic longitudinal-section of a preform molded into the vessel shown in FIG. 1.

FIG. 9B is a cross-sectional view of the preform taken along a line B—B in FIG. 9A.

FIG. 9C is a perspective view of the internal partition wall shown in FIG. 9A.

FIG. 11 is a schematic longitudinal-section of a blow molding device for biaxially stretching and blow molding the preform into a vessel.

FIG. 12 is a schematic cross-section of the blow molding device shown in FIG. 11, illustrating the plane arrangement of the stretching rods and air ducts.

BEST MODES FOR CARRYING OUT THE INVENTION

The present invention will now be described in detail mainly with reference to some embodiments of the present invention which are applied to the molding of vessels having square cross-sections and made of polyethylene terephthalate (which will be called simply "PET").

Figure 1:
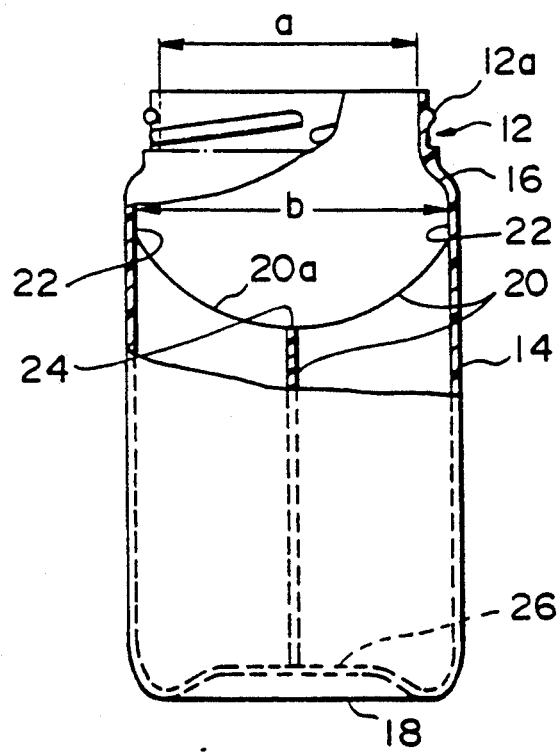
FIG. 1 is a schematic view, partially broken, of a plastic vessel having an internal partition wall.
Figure 2:
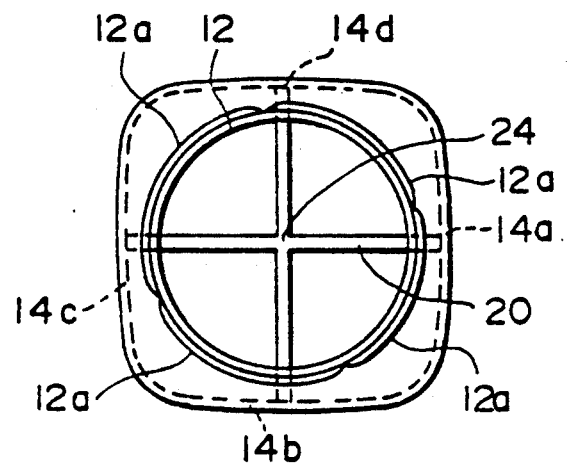
FIG. 2 is a plane view of the vessel shown in FIG. 1.

Referring to FIGS. 1 and 2, a vessel 10 comprises an open top portion 12 which has an opening having its internal diameter (a) and a threaded portion 12a formed around the outer peripheral wall of the open top portion 12, a cylindrical barrel portion 14 of square cross-section having an internal diameter (b) larger than the internal diameter (a) of the open top portion 12, a curved shoulder portion 16 smoothly connecting between the open top and barrel portions 12, 14, and a bottom portion 18 closing the barrel portion 14 at the end remote from the open top portion 12.

The vessel 10 also comprises an internal partition wall 20 formed therewithin, which extend from the inner wall of the bottom portion 18 toward the top portion 12. The internal partition wall 20 includes four partition portions which are respectively connected to the inner side walls 14a–14d of the square-shaped barrel portion 14 at the respective connections 22 and which intersect each other at the center 24 of the internal partition wall 20 to form a cross-shaped cross-sectional configuration.

In this embodiment, the top edge 20a of the internal partition wall 20 is positioned at the upper part of the barrel portion 14 short of the open top portion 12, that is, at a position near the lower part of the shoulder portion 16. The top edge 20a of the internal partition wall 20 is formed to have the maximum level at the said connections 22 and the minimum level at the center 24 of the internal partition wall 20. The maximum and minimum level portions are connected to each other by a curved configuration having a continuously varying height.

In case of the vessel 10 of such a square cross-section as shown in FIG. 2, the internal partition wall 20 has a connection 22 on the respective one of the four side walls 14a–14d at its intermediate location and four partition portions which intersect each other at the center 24 of the internal partition wall 20 and extend directly from inner bottom connecting portion 26. Thus, each of the side walls 14a–14d of the barrel portion 14 and the bottom portion 18 are connected with one another through the cross-shaped internal partition wall 20 to provide a substantially improved mechanical strength in the side walls 14a–14d and bottom portion 18.

The provision of such an internal partition wall 20 can not only increase the mechanical strength in the side walls 14a–14d, but also reduce the total internal pressure acting on each of the side walls 14a–14d. In other words, the internal pressure acting on each of the side walls 14a–14d can be reduced by the total internal pressure acting on the internal partition wall 20, thus being capable of preventing the barrel portion 14 from being distorted by the internal pressure in the vessel.

The variation of the top edge of the internal partition wall 20 from the maximum height at the side connection 22 to the minimum height at the center 24 as shown in FIG. 1 can best facilitate the molding thereof.

Figure 3:
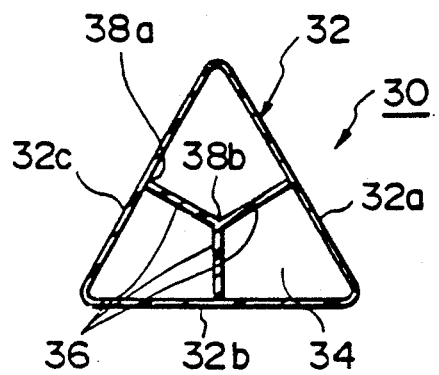
FIG. 3 is a schematic cross-section of a vessel of triangular cross-section having an internal partition wall.

FIG. 3 shows a vessel 30 of triangle cross-section to which the present invention is applied. The vessel 30 comprises an internal partition wall 36 formed therein which includes three partition portions extending longitudinally from the bottom portion 34 and also radially from the center 38b to the respective side walls 32a–32c, each partition portion being connected to the intermediate location of the corresponding one of the three side walls 32a–32c at the connection 38a. The angular spacing between each pair of adjacent side walls is equal to 120 degrees.

Figure 4:
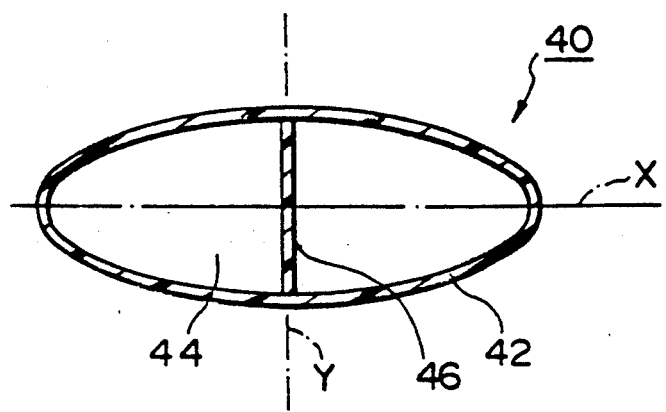
FIG. 4 is a schematic cross-section of a vessel of oval cross-section having an internal partition wall.

FIG. 4 shows a vessel 40 of oval cross-section which includes an internal partition wall 46 longitudinally extending from the bottom portion 44 and connecting the side walls of the barrel portion 42 opposed to each other in the direction of short axis Y. A plurality of such internal partition walls 46 may be provided parallel to the short axis Y to more reliably prevent the barrel portion 42 from being distorted.

Figure 5:
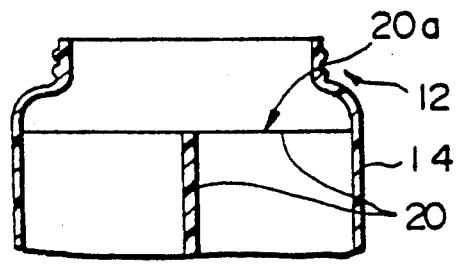
FIG. 5 is a schematic longitudinal-section of a vessel having an internal partition wall which is flat at the top edge thereof.
Figure 6:
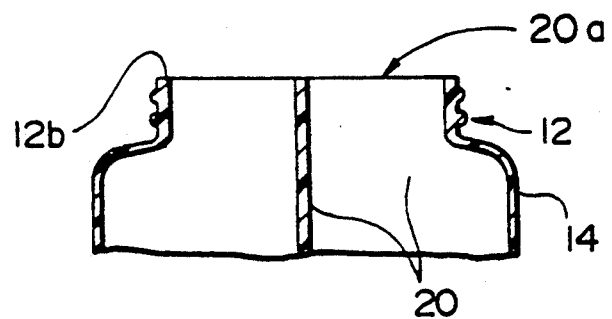
FIG. 6 is a schematic longitudinal-section of a vessel having an internal partition wall which is extended to the same level as the top edge of the top portion of the vessel.

FIGS. 5 and 6 show modifications with respect to the height of the internal partition wall 20 shown in FIG. 1. In FIG. 5, the top edge 20a of the internal partition wall 20 extends perpendicular to the longitudinal axis thereof. Although the internal partition walls 20 shown in FIGS. 1 and 5 have their top edges terminating at the halfway position of the barrel portion 14, the top edge 20a of the internal partition wall 20 may extend to the same level as the top edge 12b of the open top portion 12, as shown in FIG. 6. In such an arrangement as shown in FIG. 6, a cap mounted on the top portion 12 will have its inner wall sealing between the top edge 12b of the top portion 12 and the top edge 20a of the internal partition wall 20. Thus, the partitions divided by the cross-shaped internal partition wall 20 can be sealingly separated from one another and receive different types of contents such as teas, spices and candies without mixture.

Figure 7:
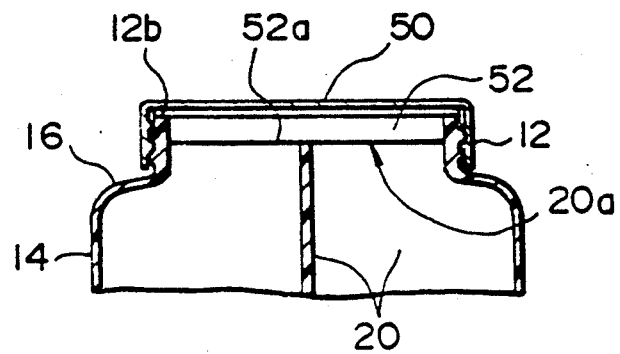
FIG. 7 is a schematic longitudinal-section of a vessel having an internal partition wall which is formed to have such a height that the top portion of the vessel can be air-tightly sealed by an internal cap.

FIG. 7 shows a modified embodiment having the same function as that of the embodiment shown in FIG. 6. In the embodiment of FIG. 7, the top edge 20a of the open internal partition wall 20 terminates at the midway level of the open top portion 12 and also extends perpendicular to the longitudinal axis of the internal partition wall 20. If an external cap 50 having an internal cap 52 as made of plastic is threadedly mounted on the top portion 12 of the vessel, the bottom face 52a of the internal cap 52 can seal the top edge 20a of the internal partition wall 20. Thus, a vessel may be provided which can receive different types of contents in the respective partitions, as in the embodiment of FIG. 6.

Figure 8A:
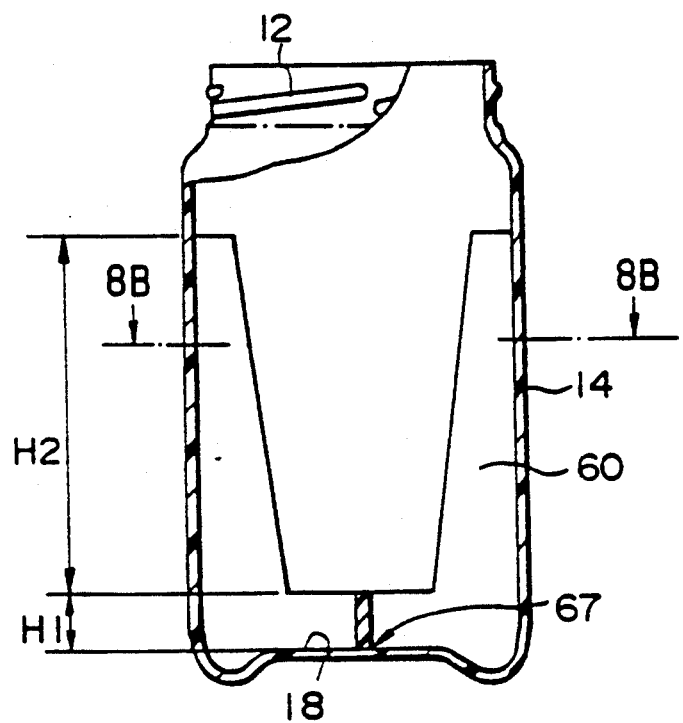
FIG. 8A is a schematic longitudinal-section of a modified top configuration of the internal partition wall.
Figure 8B:
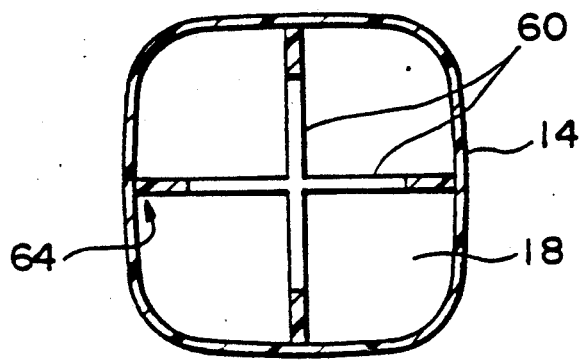
FIG. 8B is a cross-sectional view of the vessel taken along a line A—A in FIG. 8A.

FIGS. 8A and 8B show a further modification of the internal partition wall 20 shown in FIG. 1. The vessel 10 comprises an internal partition wall 60 of cross-shaped cross-section which includes a central wing portion having a relatively small height shown by H1 and four side wing portions having a substantially large height shown by H2. The internal partition wall 60 is connected at a connecting portion 67 to the inner wall of the bottom portion 18 and at a connecting portion 64 to the respective side walls 14a–14d.

Such an internal partition wall 60 can similarly provide a sufficient mechanical strength to the vessel 10 near the bottom portion 18 and at the four side walls 14a–14b. Thus, the barrel and bottom portions 14, 18 of the vessel will not be distorted due to the internal pressure from the content therein. Particularly, since the internal partition wall 60 is very low around the longitudinal center axis of the vessel 10 as shown by H1, the flow of content will be least disturbed by the internal partition wall 60 when the vessel 10 is tilted for drinking or pouring-out.

One embodiment of a process of molding a vessel according to the present invention will be described with reference to FIG. 9.

FIG. 9A shows a preform 70 injection molded into an intermediate product which is usable to mold the vessel 10 shown in FIG. 1. The preform 70 comprises an open top portion 72, a barrel portion 74 of circular cross-section connected to the top portion 72 and a bottom portion 76 formed to close the barrel portion 74 at the end opposite to the open top, as in the prior art. The preform 70 further comprises an internal partition wall 78 of cross-shaped cross-section connecting each pair of opposed inner side walls to each other and extending from the bottom portion 76 to a predetermined height in the direction of longitudinal axis. The top edge 80 of the internal partition wall 78 extends perpendicular to the longitudinal axis thereof. It is desirable that the wall thickness of the internal partition wall 78 is set to such sizes as shown in FIGS. 9B and 9C at various locations thereof. If it is assumed that the wall thickness of the internal partition wall 78 is a1 on the longitudinal center axis 82 at the top edge 80; a2 in each side wall connecting end 84 at the top edge 80; a3 on the longitudinal center axis 82 at the bottom edge 86; and a4 in each side wall connecting end 84 at the bottom edge 86, it is desirable that $a1 < a2 < a3 < a4$.

The setting of the sizes of the internal partition wall 78 at various locations is made from the viewpoint of providing an internal partition wall 20 having a uniform wall thickness as a whole when the preform 70 is molded into such a vessel 10 as shown in FIG. 1. This will be described in more detail later.

Figure 10:
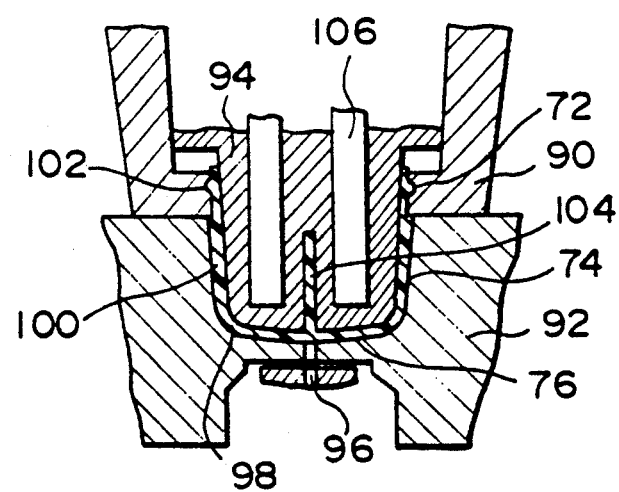
FIG. 10 is a schematic longitudinal-section of an injection molding device for injection molding a preform.

FIG. 10 shows an injection molding device for the preform 70, which comprises a top forming mold 90 for molding the open top portion 72 of the preform 70, an injection cavity mold 92 for defining the outer walls of the barrel and bottom portions 74, 76 of the preform 70, and an injection core mold 94 for defining the inner walls of the open top, the barrel and bottom portions 72, 74, 76 and the internal partition wall 78. The injection cavity mold 92 includes a central gate 96 formed therein at the bottom. Molten PET material is charged into a bottom molding cavity 98, barrel molding cavity 100 and top molding cavity 102 in the injection cavity mold 92 through the gate 96. The molten PET material is also injected into the partition molding cavity 104 of the injection core mold 94. In such a manner, the preform 70 will be injection molded. The injection core mold 94 includes cooling portions 106 through which a cooling medium is circulated to cool the resin material, each of the cooling portions 106 being located at a position corresponding to the respective one of four partitions to be divided by the internal partition wall 78 of the preform 70.

After injection molded the preform 70, the injection core mold 94 is first moved upwardly. The preform 70 is then removed from the injection cavity mold 92 while the top forming mold 90 holds the preform 70. The preform 70 is then moved to a temperature regulating step (not shown) by the use of the top forming mold 90. At the temperature regulating step, the preform 70 is heated to an optimum stretching temperature and then moved to a biaxial-stretch blow molding step shown in FIG. 11.

The biaxial-stretch blow molding step utilizes a split blow cavity mold 110 having a mold cavity substantially in conformance with the outer walls of the barrel, shoulder and bottom portions (14, 16 and 18) of the vessel 10 shown in FIG. 1. The blow cavity mold 110 includes a bottom mold 112 connected thereto at the open bottom and is also connected at the open top to a vertically movable blow core mold 114. On operation, after the preform 70 is moved into the biaxial-stretch blow molding step by the top forming mold 90, the bottom mold 112 is first moved vertically, and then the split blow cavity mold 110 is closed. Thereafter, the blow core mold 114 is inserted into the top portion 72 of the preform 70 through the top forming mold 90.

The blow core mold 114 is characterized by that in this embodiment, it comprises four stretching rods 120 each located at a position corresponding to the respective one of four partitions separately divided by the internal partition wall 78 of the preform 70 and four blow air ducts 122 each similarly located at a position corresponding to the respective partition aforementioned. The plane arrangement of these stretching rods and air ducts is as shown in FIG. 12. As will be apparent from FIG. 12, this embodiment includes the four stretching rods 120 each of which is substantially centrally disposed within the corresponding partition. Each of the four blow air ducts 122 includes an air discharge port 124 which is offset from the stretching rod 120 in the same partition.

After the molds have been arranged as aforementioned, the four stretching rods 120 are then moved downwardly to stretch the preform 70 along the longitudinal axis thereof. At the same time, the pressurized air is blown into the respective partitions of the preform 70 through the air discharge ports 124 of the blow air ducts 122 to stretch the preform 70 in the transverse direction. If the four stretching rods 120 are driven by the same drive, the preform 70 can be longitudinally stretched at the same speed with respect to the respective partitions divided by the internal partition wall 78. Moreover, if the pressurized air is introduced into the four partitions substantially with the same pressure level, the vessel 10 can be blow molded without distortion and uneven wall thickness in the internal partition wall 20.

The aforementioned values a1-a4 of wall thickness in the internal partition wall 78 of the preform 70 are set for the following reasons.

From experiments, the inventors have found that when the barrel and bottom portions 74, 76 of the preform 70 are stretch blow molded in the longitudinal and transverse directions, the side wall connecting edges 84 of the internal partition wall 78 are more easily stretched than the central portion 82 thereof and also that the bottom connecting edge 86 of the internal partition wall 78 is more easily stretched than the top edge 80 thereof. It is believed that the side wall connecting edges 84 of the internal partition wall 78 are subjected to a stretching force higher than the central portion 82 since the side wall connecting edges 84 follow the barrel portion 74 being stretched. If the central and side portions 82, 84 of the internal partition wall 78 of the preform 70 have the same wall thickness at the top edge 80 (a1=a2), the vessel 10 will be biaxially stretch blow molded with the central portion 24 of the internal partition wall 20 having its wall thickness larger than that of each of the side portions 22. This is apparently undesirable in that the vessel 10 has no uniform wall thickness throughout. If the vessel 10 is molded of a transparent resin material such as PET, such an uneven wall thickness will very damage the external appearance of the vessel 10.

In addition, if the internal partition wall 78 of the perform 70 has a uniform wall thickness in the transverse direction, it will be difficult that the side portions 84 of the internal partition wall 78 follow the side barrel wall being stretched since the central portion 82 of the internal partition wall 78 is hardly stretched. This results in formation of undesirable recesses in the side wall of the bottle molded.

In order to overcome such problems, the values of wall thickness of the preform 70 in the transverse direction are set to be $a1<a2$ and $a3<a4$. This permits the internal partition wall 78 to follow the side wall being stretched since the side wall connecting portion 84 has a larger wall thickness and retains a high temperature. Since on the other hand, the central portion 82 of the preform 70 is subjected to a smaller stretching force, it has been previously set to have a smaller wall thickness. Thus, the vessel 10 will finally have an uniform wall thickness throughout since the final wall thickness of the central portion 82 becomes substantially equal to that of the side portion 84 more stretched.

Normally, the top and bottom portions 80, 86 of the internal partition wall 78 in the preform 70 have a draft angle in view of the release properties in the injection core mold 94. It has been found that any irregularity in wall thickness providing the reduced wall thickness of the bottom portion 26 in the internal partition wall 20 of the molded vessel 10 cannot be overcome by a difference in wall thickness as being provided by such a draft angle. However, if the setting of wall thickness to be $a1<a3$ and $a2<a4$ is made to provide a differential size which is larger than the normal draft angle but suitably depends on the ratio of longitudinal stretch in the vessel 10, the internal partition wall 20 of the molded vessel 10 can have a substantially uniform wall thickness therethrough from the bottom to top ends. Since the preform 70 more easily has a temperature profile distributed throughout along the longitudinal axis at the temperature regulating step, the aforementioned setting of wall thickness in the internal partition wall 78 can be made only in the transverse direction.

From experiments, the inventors have found that the moldability can be improved by providing the downwardly curved top edge 20a of the internal partition wall 20 of the vessel 10 with the side portions 22 being higher than the central portion 24, as shown in FIG. 1. This is because the central portion 24 of the internal partition wall 20 is more stretched by the four stretching rods 120 in the longitudinal direction, resulting in the height of the central portion 24 to be lower than that of the top edges 20a at the side wall connecting portions 22. An amount of material saved by forming the curved top edge 20a of the internal partition wall 20 serves to save the total amount of material necessary to mold the preform 70. It has been also found that such a saving of material will not very reduce the mechanical strength in the barrel portion 14 of the vessel 10, compared with the flat top edge 20a of the internal partition wall 20 as shown in FIG. 5. Even in the arrangement of FIG. 1, the height of the top edge 20a of the internal partition wall 20 at the side wall connecting portions 22 is substantially the same as that of the arrangement shown in FIG. 5. If the height of the top edge 20a of the internal partition wall 20 at the side wall connecting portions 22 is ensured to be sufficient, the mechanical strength in the barrel portion 14 from the bottom portion to that level can be secured to prevent the barrel portion 14 from being distorted due to the internal pressure from the contents.

If it is desired to locate the top edge 20a of the internal partition wall 20 within the open top portion 12 of the vessel 10 as shown in FIGS. 6 and 7, the setting of wall thickness in the internal partition wall 78 of the preform 70 must be carefully made in consideration of the following respect:

The open top portion 12 of the preform will not substantially be stretched during the biaxial-stretch blow molding process. Thus, that portion of the internal partition wall 78 located within the open top portion 72 of the preform 70 must have its wall thickness as thin as possible in view of no stretching therein.

Various preform configurations usable to mold plastic vessels having internal partition walls will be described below.

Figure 13:
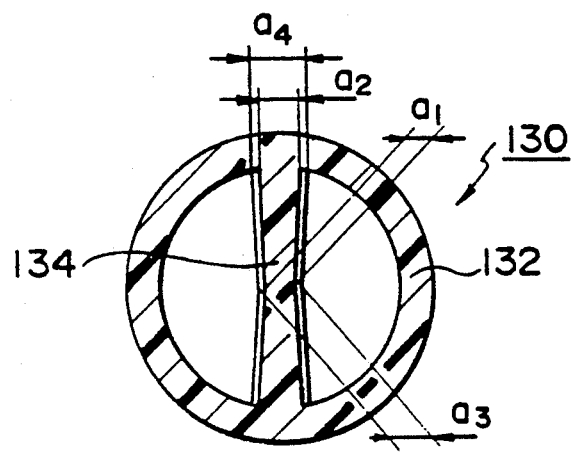
FIG. 13 is a cross-sectional view of a preform usable to mold the vessel shown in FIG. 4.

FIG. 13 shows a preform 130 usable to mold the vessel shown in FIG. 4. The preform 130 has an internal partition wall 134 extending across the barrel portion 132 of circular cross-section from one side to the other and longitudinally from the bottom portion. The wall thickness of the internal partition wall 134 is set at various locations to be $a1<a2$ and $a1<a3<a4$, as shown in FIG. 9C.

Figure 14:
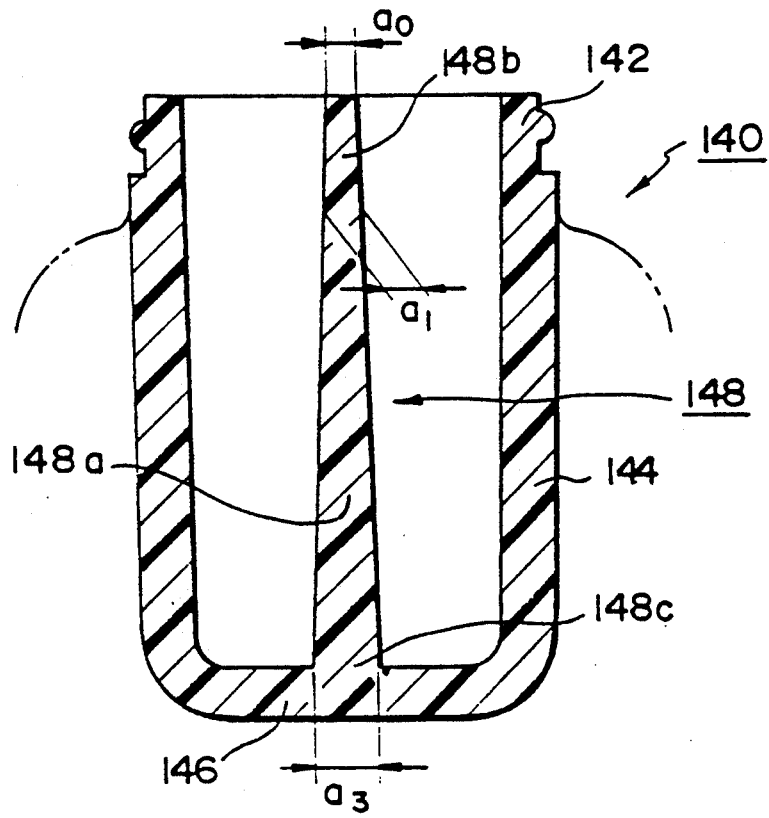
FIG. 14 is a longitudinal-sectional view of a preform usable to mold the vessel shown in FIG. 6.

FIG. 14 shows a preform 140 usable to mold the vessel of FIG. 6. The preform 140 has an internal partition wall 148 extending longitudinally from a bottom portion 146 to the same level as that of the top edge of an open top portion 142. The internal partition wall portion 148a present in a barrel portion 144 has the maximum wall thickness a3 at an end portion 148c at which the internal partition wall is connected to the bottom portion 146, with the wall thickness of the internal partition wall portion 148a being gradually reduced toward the upper partition portion having its smaller wall thickness a1 located near the top end of the barrel portion 144. It is preferred that the internal partition wall portion 148b present in the open top portion 142 has a wall thickness a0 equal to or smaller than the wall thickness a1 in the barrel portion 144 of the preform 140. This is for such a purpose that the internal partition wall portion 148b in the open top portion 142 is not substantially caused to be stretched. It is particularly preferred that the thinner internal partition wall portion 148b in the open top portion 142 has been previously regulated into a temperature lower than those of the remaining regions to be stretched at the temperature regulating step prior to the biaxial-stretch blow molding step.

In case where the top edge of the internal partition wall terminates at any level in the open top portion 12 as in FIG. 7, the internal partition wall portion present in the open top portion of its preform may have a wall thickness set as in FIG. 14.

Figure 15:
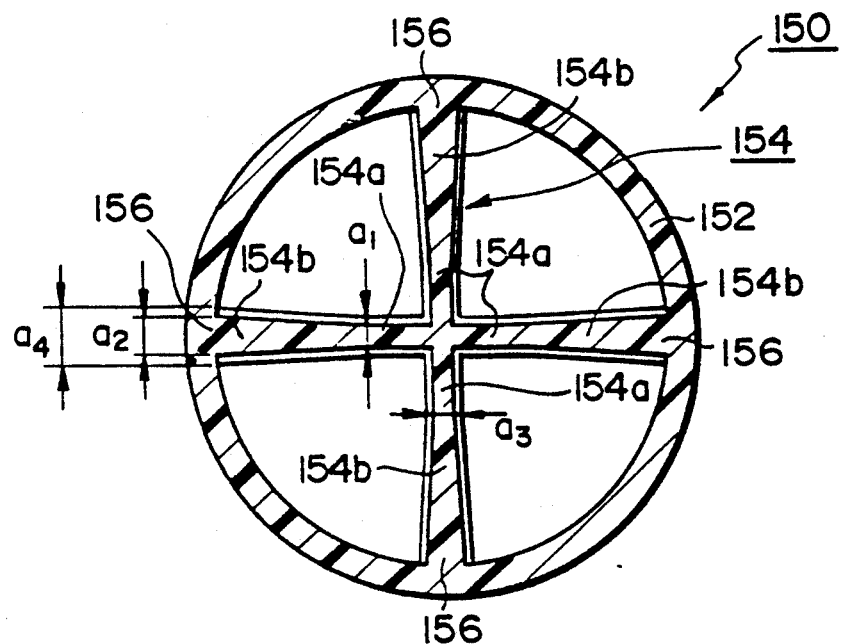
FIG. 15 is a cross-sectional view of a modified preform usable to mold the vessel shown in FIG. 1.
Figure 16:
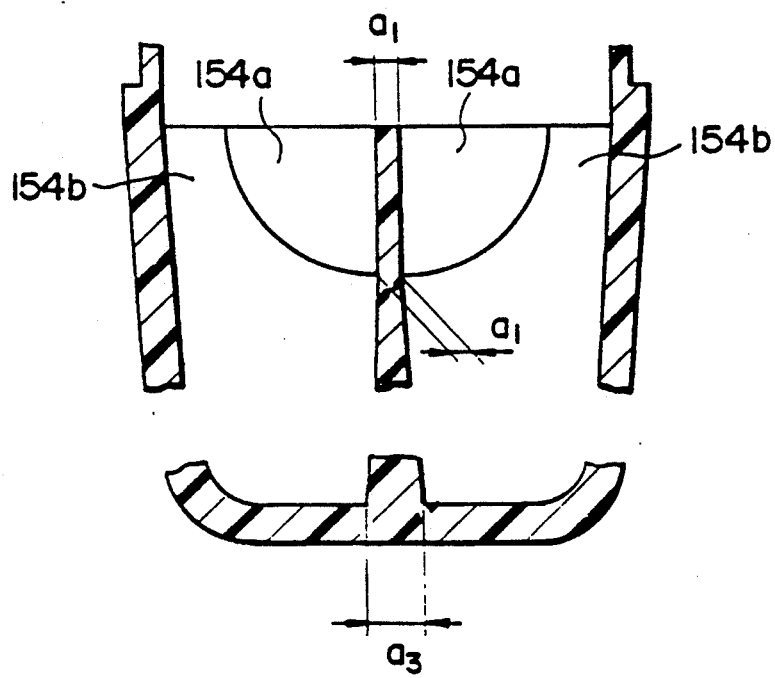
FIG. 16 is a schematic longitudinal-section of a distribution of uniform wall thickness areas shown in FIG. 15.

FIG. 15 shows a preform 150 usable to mold the vessel of FIG. 1. The preform 150 has an internal partition wall 154 extending across the barrel portion 152 and having a cross-shaped cross-section. The internal partition wall 154 has four uniform thickness portions 154a having the same wall thickness a1 near the longitudinal center axis thereof. The internal partition wall 154 also has four thickness-transition portions 154b each connected between the corresponding uniform thickness portion 154a and the end portion 156 connecting to the inner wall of the barrel portion 152. Each of the thickness-transition portions 154b has a wall thickness varying from the minimum value a1 to the maximum value a2. The provision of these four uniform thickness portions 154a is because the central portions of the internal partition wall 154 are hardly stretched. Thus, the external appearance of the vessel will not be damaged after it has been molded, since any distortion will not be created at the internal partition wall 154 if the uniform thickness portions 154a have been previously set to have substantially final wall thickness in the molded vessel. In the viewpoint of such a setting, it is desirable that each of the uniform thickness portions 154a extends to form a quadrant near the top edge of the internal partition wall 154, as shown in FIG. 16. Each of the uniform thickness portions 154a may have its outer easily stretchable side having a relatively large wall thickness.

Figure 17:
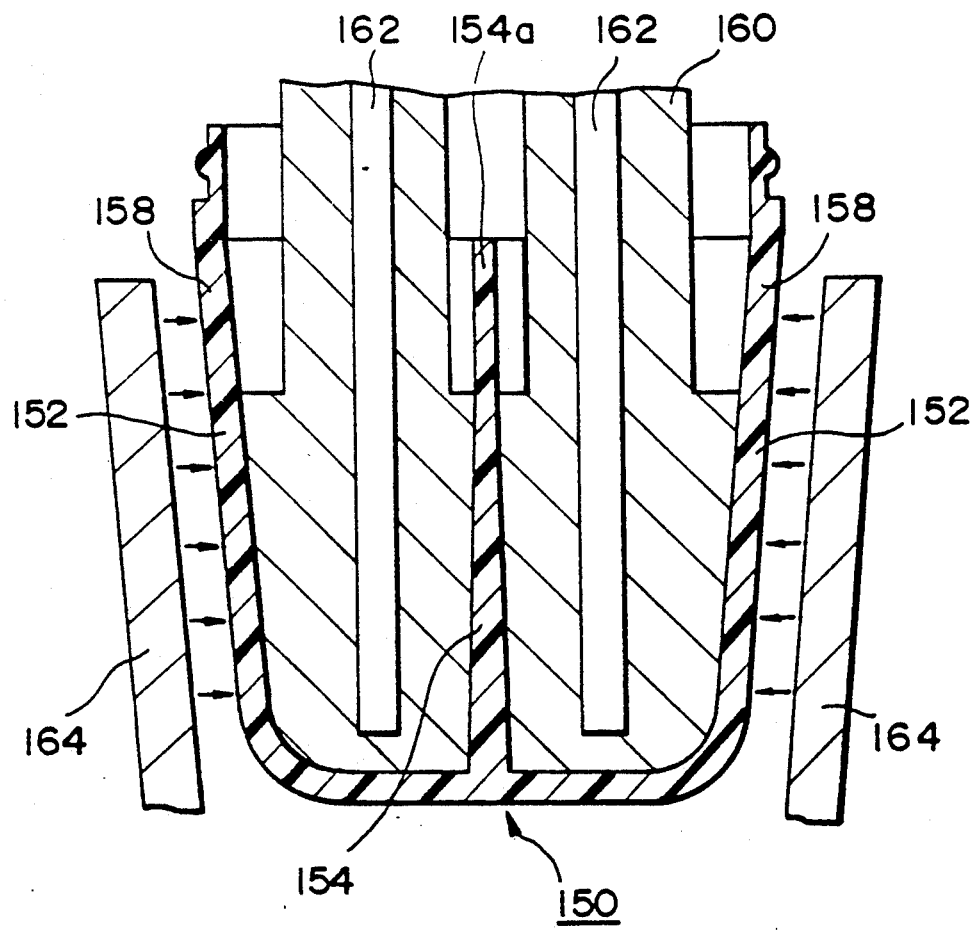
FIG. 17 is a schematic longitudinal-section of the preform shown in FIG. 16, illustrating a step of regulating the temperature of the preform.

FIG. 17 illustrates the temperature regulating step for the preform 150 shown in FIG. 16. The preform 150 receives a temperature regulating core 160 having cooling jackets 162 and is surrounded by a temperature regulating pot 164. The cooling jackets 162 of the temperature regulating core 160 contains a temperature regulating medium such as hot water or oil which is circulated therethrough to cool the wall of the preform 150 to an appropriate stretching temperature. In order to promote the stretch in the less stretchable uniform thickness portions 154a to prevent any irregular thickness distribution, the temperature regulating core 160 is not in contact with the uniform thickness portions 154a. Similarly, the temperature regulating core 160 is separated from a shoulder 158, that is, the connection between the top and barrel portions which must be sufficiently stretched. Unlike the arrangement of FIG. 17, the temperature regulating core may include a heater for heating the preform. In the latter case, a more efficient radiant heating may be attained if the distance between the temperature regulating core and the uniform thickness and shoulder portions is reduced compared with the remaining regions.

The other reason why the thinner uniform thickness portions 154a are formed in the internal partition wall near the longitudinal center axis thereof is for preventing the longitudinal center axis from being offset from the proper position when the internal partition wall is biaxially stretched. As described hereinbefore, the stretching is carried out by the stretching rod and blow air for each of the partitions divided by the internal partition wall. The longitudinal center axis of the internal partition wall tends to be offset from the proper position, due to various factors such as a deviation of a stretching rod in each partition from the proper position, a difference of blow pressure between the adjacent partitions, an irregular distribution of temperature in the preform and so on. If the internal partition wall portions near the longitudinal center axis have their relatively thin wall thickness, the heat capacity therein can be reduced to suppress the stretch. This in turn suppresses the creation of offset in the longitudinal center axis of the internal partition wall. From the viewpoint of such a fact, the uniform thinner thickness portions of the internal partition wall are preferably formed to extend along the longitudinal center axis from the top edge to the bottom edge of the internal partition wall, rather than the distribution of FIG. 16.

Figure 18:
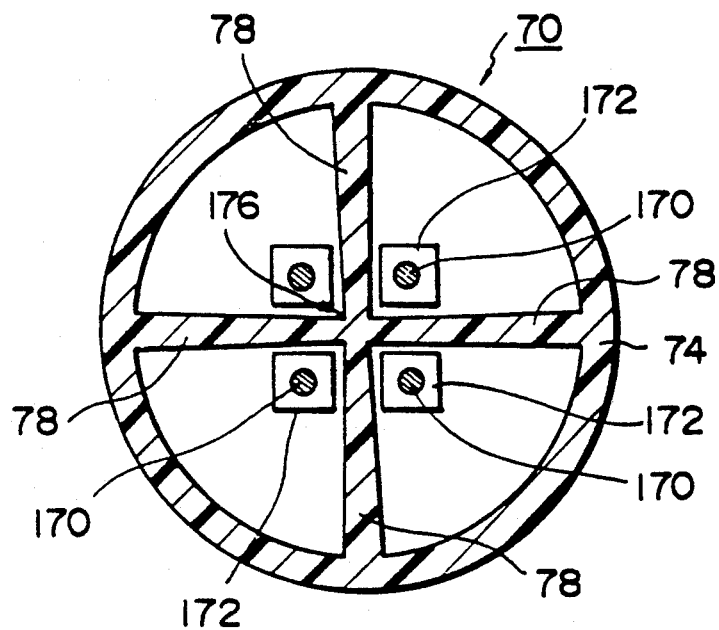
FIGS. 18 and 19 respectively illustrate the arrangements of stretching rods and tip members which are offset toward the longitudinal center axis of the preform.
Figure 19:
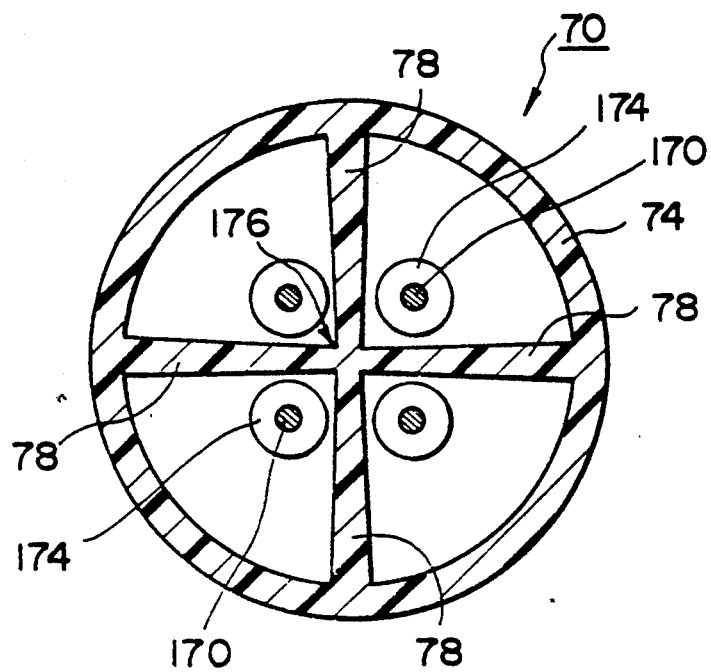

FIGS. 18 and 19 illustrate two different arrangements of stretching rods which are usable at the biaxial-stretch blow molding step. These arrangements of stretching rods are different from that of FIG. 11 in that each of the stretching rods 170 is offset toward the longitudinal center axis of the preform 70 in the respective one of the partitions divided by the internal partition wall. FIG. 18 shows the stretching rods 170 each including a tip member 172 of quadrilateral cross-section formed thereon at the bottom end while FIG. 19 shows the stretching rods 170 each having a tip member 174 of circular cross-section formed thereon at the bottom end. Each of the tip members 172 and 174 is not in contact with the internal partition wall 78, but is disposed at a position near a corner 176 at which each pair of adjacent internal partition wall portions defining one partition intersect each other. Such an arrangement can prevent any deviation in the longitudinal center axis of the cross-shaped internal partition wall 78 such that the internal partition wall can be guided directly downwardly along the longitudinal center axis thereof. Particularly, the tip members 172 of the stretching rods having their cross-sectional configuration in more conformance with that of the respective corners 176 at the internal partition wall as shown in FIG. 18 can more effectively prevent the deviation in the longitudinal center axis of the internal partition wall.

Figure 20:
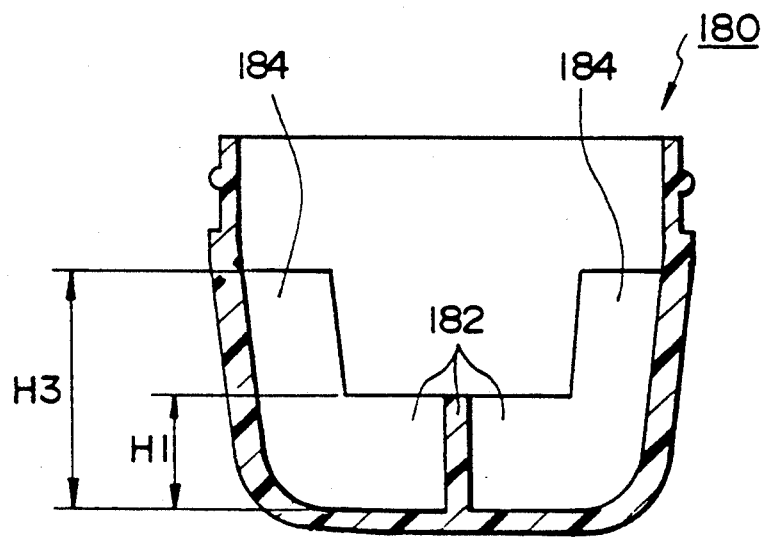
FIG. 20 is a schematic longitudinal-section of a preform usable to mold the vessel shown in FIG. 8.

FIG. 20 shows a preform 180 usable to mold the vessel shown in FIG. 8A. The preform 180 has an internal partition wall of a cross-shaped cross-section which comprises four first or central wing portions 182 each having a height H1 near the longitudinal center axis of the internal partition wall and four second or side wing portions 184 connected between the respective central wing portions 182 and the side barrel wall of the preform 180 and having a height H3 larger than the height H1. The height H1 of the central wing portions 182 is substantially equal to the height of the central wing portion of the internal partition wall 60 in the blow molded vessel 10. This is enabled from the fact that the central wing portions 182 of the internal partition wall will not substantially be stretched as will be described later.

Figure 21:
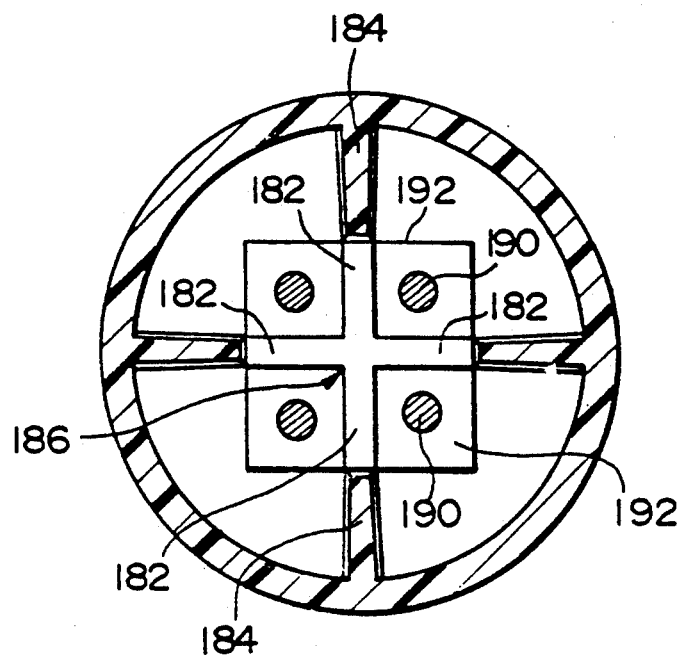
FIGS. 21 and 22 are schematic views respectively illustrating the arrangements of stretching rods and tip members which are usable in the preform shown in FIG. 20.
Figure 22:
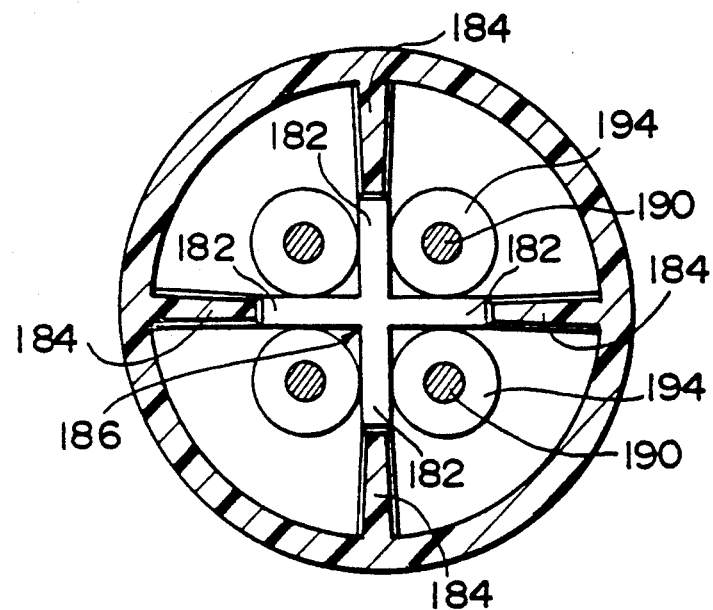

Such a process will be described in connection with FIGS. 21 to 23. Referring now to FIGS. 21 and 22, there are shown two different arrangements of stretching rods 190 and their tip members 192 and 194 which are used at the biaxial-stretch blow molding step. According to FIGS. 21 and 22, as in FIGS. 18 and 19, each of the stretching rods 190 is disposed to be offset toward the longitudinal center axis of the preform in the respective one of four partitions divided by the internal partition wall. Each of the tip members 192 or 194 on the bottom end of the respective stretching rods 190 is in contact with each pair of adjacent first or central wing portions 182 so that each central portion 182 will be sandwiched between two tip members 192 or 194. In the arrangement of FIG. 21, each of the tip members 192 has a quadrilateral cross-section which conforms to the corresponding corner 186 at the intersection of each pair of adjacent central or first wing portions 182 of the internal partition wall. Thus, each tip member 192 is in face contact with two adjacent central wing portions 182 in addition to contact with the corner 186. In the arrangement of FIG. 22, each of the tip members 194 is not in contact with the corresponding corner 186 since it is of circular cross-section. However, each tip member 194 is in linear contact with two adjacent central wing portions 182 such that one central wing portion 182 will be sandwiched between two adjacent tip members 194.

Figure 23:
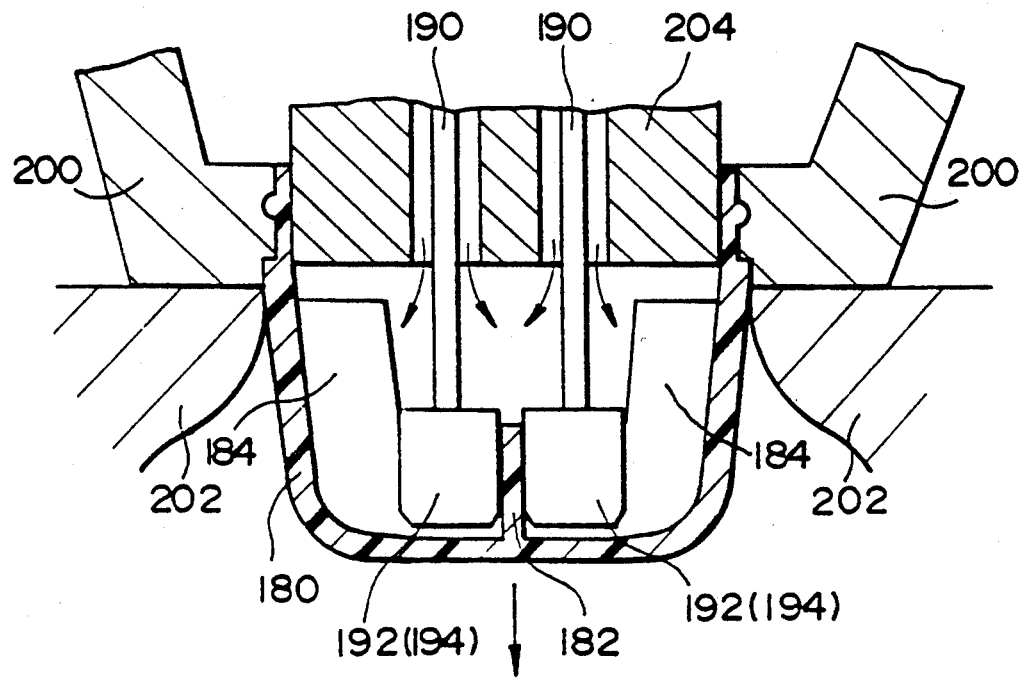
FIG. 23 is a schematic longitudinal-section of a preform which is being biaxially stretched and blow molded by the use of the stretching rods shown in FIGS. 21 and 22.

FIG. 23 illustrates the biaxial-stretch blow molding step in which the stretching rods shown in FIGS. 21 and 22 are used. In this figure, the preform 180 is placed within a blow cavity mold 202 while being held by a neck mold 200. A blowing core 204 is inserted into the open top of the preform 180. The blowing core 204 movably supports four stretching rods 190. Thus, blow air may be blowed into the interior of the preform through an annular space between each of the stretching rods and the inner wall of a bore through which that stretching rod passes. In any event, each of the first wing portions 182 of the internal partition wall is sandwiched between two adjacent tip members 192 or 194. Thus, the central or first wing portions 182 will not substantially be stretched in both the longitudinal and transverse directions. On the other hand, the second or side wing portions 184 having their relatively large wall thickness can be more easily stretched with the side wall of the barrel portion. As a result, the vessel 10 will be biaxially stretch blow molded with such an internal partition wall 60 as shown in FIG. 8.

It is to be understood that the present invention is not limited to the aforementioned embodiments and may be carried out with many changes and modifications without departing from the spirit and scope of the invention as defined in the appendant claims.

Although the embodiments have been described as to the polygonal and oval cross-sections of the vessel 10, the present invention may be similarly applied to a vessel of circular cross-section which is biaxial-stretch blow molded with the barrel and bottom portions having a mechanical strength sufficient to prevent any distortion due to the internal pressure from the contents in the vessel. Although the present invention is preferably applied to wide-mouthed bottles subjected to less longitudinal stretch from the viewpoint of strengthening the barrel portions of the molded bottles, the present invention can similarly prevent any distortion due to the internal pressure from the contents therein in many vessels other than the wide-mouthed bottles.

I claim:

1. A preform to be biaxially stretched and blow molded into a plastic vessel, said preform comprising an open top portion, a cylindrical barrel portion, a bottom portion formed to close the barrel portion at the end opposite to the open top and an internal partition wall formed within said barrel portion to extend from one side to the other side of the inner wall and to extend longitudinally from the bottom portion, said preform being characterized by that said internal partition wall has a thickness profile in the transverse direction relative to the longitudinal axis of the preform in which the wall thickness is maximum at the connection between the internal partition wall and the inner wall of the barrel portion, the wall thickness of the internal partition wall is gradually reduced toward the longitudinal center axis of the preform.

2. A preform as defined in claim 1, characterized by that said internal partition wall has a thickness profile in the longitudinal direction in which the wall thickness is maximum at the connection between said internal partition wall and said bottom portion, the wall thickness of said internal partition wall is gradually reduced toward the top edge of said internal partition wall.

3. A preform as defined in claim 2, characterized by that said internal partition wall has at least one uniform thickness portion at a position near the longitudinal center axis of said internal partition wall and has a thickness transition portion formed to extend from the maximum wall thickness in the longitudinal and transverse directions to the end of said uniform thickness portion.

4. A preform as defined in claim 1, characterized by that the top edge of said internal partition wall is located in said barrel portion at a position short of said top portion.

5. A preform as defined in claim 4, characterized by that the top edge of said internal partition wall near the longitudinal center axis of said preform has a height lower than that of the top edge of said internal partition wall near the connection between said internal partition wall and the inner wall of said barrel portion.

6. A preform as defined in claim 5, characterized by that the central portion of said internal partition wall having its top edge lower than that of the side portion is a substantially uniform thickness portion in the transverse direction relative to the longitudinal center axis of said preform and that said internal partition wall has a thickness transition portion formed to extend from the maximum wall thickness at the connection between said internal partition wall and the inner wall of said barrel portion to the end of said uniform thickness portion in the transverse direction.

7. A preform as defined in claim 1, characterized by that the top edge of said internal partition wall is located at the same level as the top edge of said open top portion and that the portion of said internal partition wall located within said top portion has a wall thickness smaller than the minimum wall thickness of said internal partition wall located within said barrel portion.

8. A preform as defined in claim 1, characterized by that the top edge of said internal partition wall is located in said open top portion at a position short of the top edge of said open top portion and formed to be flat in the transverse direction and that the portion of said internal partition wall located within said open top portion has a wall thickness smaller than the minimum wall thickness of said internal partition wall located within said barrel portion.

9. A process of biaxial-stretch blow molding a plastic vessel, said process being characterized by the steps of injection molding a preform having an open top portion, a cylindrical barrel portion having a closed bottom, and an internal partition wall formed to extend from one side of the inner wall of the barrel portion to the other side of the same and to extend longitudinally from the inner face of the closed bottom, stretchedly driving said bottom portion along the longitudinal axis of said preform by the use of a plurality of stretching rods each arranged for the respective one of partitions divided by the internal partition wall of said preform while at the substantially same time stretching said preform in the transverse direction by introducing a pressurized air into the respective divided partitions, the inner end of each of said stretching rods including a tip member arranged therein at a position offset toward the longitudinal center axis of said preform than the center of the corresponding partition, whereby said internal partition wall can be guided by said tip members when said preform is being stretched along the longitudinal axis thereof.

10. A process as defined in claim 9, characterized by that said internal partition wall includes three or more partition portions radially extending from the longitudinal center axis of said preform, said partition portions being joined together at said longitudinal center axis to form a joint portion and that each of said tip members has an external contour corresponding to the configuration of a corner formed at the intersection between two adjacent partition portions defining one partition, whereby said tip members can guide said joint portion along said longitudinal center axis when said preform is stretched in the longitudinal direction.

11. A process as defined in claim 9, characterized by that said injection molding step includes a step of injection molding said preform such that the top edge of said internal partition wall is located within said barrel portion at a position short of said open top portion and the top edge of said internal partition wall at a position near said longitudinal center axis of said preform has a height lower than that of the top edge of said internal partition wall near the connection between said internal partition wall and the inner wall of said barrel portion and that said biaxial-stretch blow molding step includes a step of stretching said internal partition wall in the longitudinal direction with the central portion thereof near the longitudinal center axis being sandwiched by two adjacent tip members which are in contact with the central portion of said internal partition wall.

12. A process as defined in claim 11, characterized by that said internal partition wall includes three or more partition portions radially extending from the longitudinal center axis of said preform, said partition portions being joined together at said longitudinal center axis to form a joint portion and that each of said tip members has an external contour capable of contacting a corner formed at the intersection between two adjacent partition portions defining one partition, whereby said internal partition wall sandwiched by said tip members can be stretched along said longitudinal center axis.

13. A process as defined in claim 9, characterized by that said process comprises, prior to said biaxial-stretch blow molding step, a step of temperature regulating the inner and outer walls of said barrel portion and the opposite walls of said internal partition wall in said preform into an appropriate stretching temperature, said temperature regulating step including a step of providing a distribution of temperature in said internal partition wall that at least the upper region of said internal partition wall has a temperature higher than that of the lower region of said internal partition wall.

14. A process as defined in claim 13, characterized by that said temperature regulating step uses a temperature regulating core for temperature regulating the inner wall of said barrel portion and the opposite sides of said internal partition wall, said temperature regulating core being locally placed adjacent to or in contact with the region of said internal partition wall that should be regulated to a higher temperature.

* * * * *

UNITED STATES PATENT AND TRADEMARK OFFICE
CERTIFICATE OF CORRECTION

PATENT NO. : 5,232,108
DATED      : August 3, 1993
INVENTOR(S): Yoshinori NAKAMURA It is certified that error appears in the above-identified patent and that said Letters Patent is hereby corrected as shown below:

ON THE COVER PAGE:

[73]   Change "Nissei Asb Machine Co., Ltd.,

Komor, Japan" to

[73]   --Nissei ASB Machine Co., Ltd.,

Nagano, Japan--.

Signed and Sealed this

Twenty-ninth Day of March, 1994

Attest:

BRUCE LEHMAN

Attesting Officer            Commissioner of Patents and Trademarks